(12) United States Patent
Morita

(10) Patent No.: US 8,439,579 B2
(45) Date of Patent: May 14, 2013

(54) SINGLE-LENS REFLEX CAMERA USING PHASE DIFFERENCE DETECTION METHOD

(75) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/295,631

(22) Filed: Nov. 14, 2011

(65) Prior Publication Data

US 2012/0128342 A1    May 24, 2012

(30) Foreign Application Priority Data

Nov. 19, 2010    (JP) .................................. 2010-258706

(51) Int. Cl.
*G03B 19/12*    (2006.01)

(52) U.S. Cl.
USPC .............................. 396/354; 396/111; 396/535

(58) Field of Classification Search .................... 396/354
See application file for complete search history.

(56) References Cited

U.S. PATENT DOCUMENTS

| 4,668,065 | A | * | 5/1987 | Tanaka et al. ................. | 396/358 |
| 4,959,677 | A | | 9/1990 | Suda et al. | |
| 5,033,844 | A | * | 7/1991 | Itabashi ........................ | 396/111 |
| 5,041,858 | A | | 8/1991 | Yamamichi et al. | |
| 5,264,887 | A | * | 11/1993 | Fukahori ....................... | 396/447 |
| 5,970,258 | A | | 10/1999 | Suda et al. | |
| 5,980,122 | A | * | 11/1999 | Higashihara et al. ......... | 396/354 |
| 6,707,994 | B2 | * | 3/2004 | Nakagawa ..................... | 396/97 |
| 6,874,955 | B2 | * | 4/2005 | Morishita ..................... | 396/354 |
| 2006/0275026 | A1 | | 12/2006 | Oikawa | |
| 2007/0091438 | A1 | | 4/2007 | Shibazaki | |
| 2008/0019686 | A1 | | 1/2008 | Inukai et al. | |
| 2008/0225157 | A1 | | 9/2008 | Nishimoto et al. | |

FOREIGN PATENT DOCUMENTS

| JP | 61032044 | A | * | 2/1986 |
| JP | 03237443 | A | * | 10/1991 |
| JP | 06-308375 | | | 11/1994 |
| JP | 09265117 | A | * | 10/1997 |
| JP | 2004-179868 | A | | 6/2004 |

OTHER PUBLICATIONS

The above references were cited in a Extended European Search Report issued on Apr. 4, 2012, which is enclosed, that issued in the corresponding European Patent Application No. 11189622.1.

* cited by examiner

*Primary Examiner* — Clayton E Laballe
*Assistant Examiner* — Leon W Rhodes, Jr.
(74) *Attorney, Agent, or Firm* — Cowan, Liebowitz & Latman, P.C.

(57) ABSTRACT

A single-reflex camera includes a mirror box, and a focus detecting unit. The mirror box further includes a first opening on a side of the image-pickup optical system, which the light flux that has passed the image-pickup optical system enters, and a bottom plate arranged between the mirror and the focus detecting unit, the bottom plate including a plate-shaped front part that extends so as to approach to an optical axis of the image-pickup optical system from the first opening. Part of the condenser lens is located on a side of the optical axis of the image-pickup optical system with respect to a line that is made by extending, parallel to the optical axis of the image-pickup optical system, an end of the first opening on a side of the bottom plate.

8 Claims, 6 Drawing Sheets

SINGLE-LENS REFLEX CAMERA USING PHASE DIFFERENCE DETECTION METHOD

BACKGROUND OF THE INVENTION

1. Field of the Invention

The present invention relates to a single-lens reflex camera.

2. Description of the Related Art

Japanese Patent Laid-Open No. ("JP") 6-308375 discloses a single-lens reflex camera that includes two light-shielding walls unparallel (not parallel) to an image-pickup plane between an expected imaging surface of an image-pickup lens and the bottom of a mirror box, and improves the focus detection accuracy by preventing stray light from entering a focus detection unit using these light-shielding walls. The bottom of the mirror-box has an opening that introduces a focus detecting light flux to the focus detecting unit, and the bottom of the mirror box has a plane parallel to an optical axis in light of the drawings of JP 6-308375.

According to JP 6-308375, an attempt to approach the focus detecting unit to the optical axis of the image-pickup lens in order to miniaturize the camera would cause the bottom of the mirror box to move up, and the flare reflected on the bottom of the mirror box to enter the image-pickup plane, hindering high-quality image pickup. In addition, when the bottom of the mirror box has a plane parallel to the optical axis, a dead space becomes wider around the focus detecting unit under it and the miniaturization becomes difficult.

SUMMARY OF THE INVENTION

The present invention provides a small single-lens reflex camera configured to provide high-quality image pickup.

A single-reflex camera according to the present invention includes a mirror box configured to house a mirror configured to deflect part of a light flux that has passed through an image-pickup optical system when the mirror is inserted into an optical path of the light flux, and a focus detecting unit that includes a condenser lens configured to condense a light flux deflected by the mirror, and provides focus detections using light condensed by the condenser lens and a phase difference method. The mirror box further includes a first opening, arranged to allow the light flux that has passed through the image-pickup optical system to enter the mirror box, a bottom plate arranged between the mirror and the focus detecting unit, the bottom plate including a front part that inclines towards an optical axis of the image-pickup optical system as it extends away from the first opening. Part of the condenser lens is located on a side of the optical axis of the image-pickup optical system with respect to a line extending from a bottom end of the first opening parallel to the optical axis of the image-pickup optical system wherein the bottom end of the first opening is the end of the first opening closest to the bottom plate.

Further features and aspects of the present invention will become apparent from the following description of exemplary embodiments with reference to the attached drawings.

DESCRIPTION OF THE PREFERRED EMBODIMENTS

Figure 1:
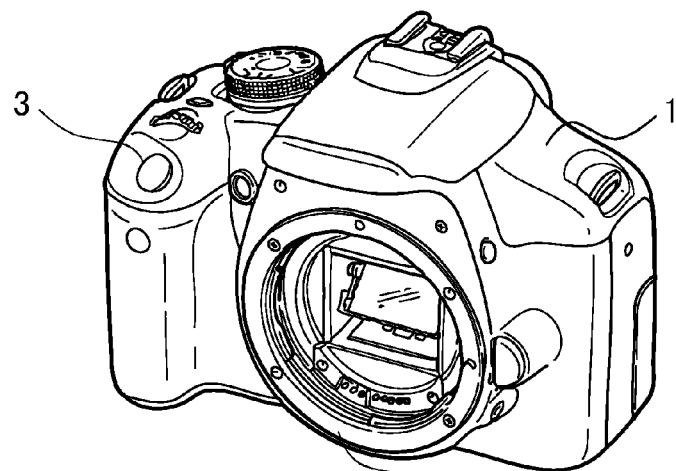
FIG. 1 is a perspective view of a single-lens reflex camera according to the present invention.

FIG. 1 is a perspective view of a digital single-lens reflex camera according to this embodiment. The present invention is also applicable to a film-based single-lens reflex camera.

In FIG. 1, reference numeral 1 denotes a camera body, and reference numeral 2 denotes a camera mount for an image-pickup lens (an image-pickup optical system) (not illustrated) that is replaceably (removably) attached to the camera body 1. Reference numeral 3 denotes a release button having a two-stage switch that can issues instructions of starts of auto-exposure ("AE") and autofocus ("AF") and image pickup. When the release button 3 is lightly pressed (half-pressed), a first switch SW1 turns on to provide the AE and AF, and when the release button 3 in this state is fully pressed, a second switch SW2 turns on to provide image pickup.

Figure 2:
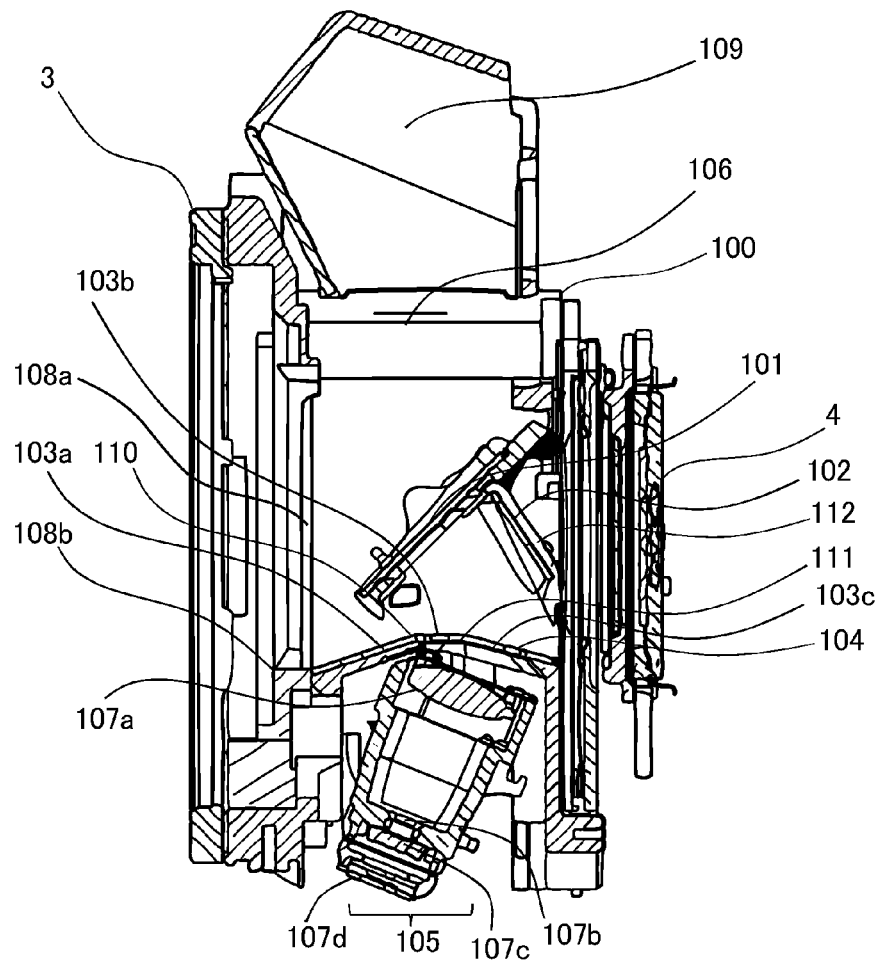
FIG. 2 is a schematic sectional view of the single-lens reflex camera illustrated in FIG. 1.

FIG. 2 is a sectional view around the mirror box 100 in the mirror down state of the single-reflex camera. The mirror box 100 is arranged between the camera mount 2 and the image-pickup element 4, the focus detecting unit 105 is located under the mirror box 100, and a (view)finder optical system is located above the mirror box 100.

The image-pickup element 4 provides a photoelectric conversion for an optical image formed by an image-pickup lens and generates image data. The image-pickup element 4 may include a Charge Coupled Device ("CCD"), a Complementary Metal Oxide Semiconductor ("CMOS") or the like. The image-pickup element 4 has a rectangular image-pickup plane perpendicular to the optical axis 50 of the image-pickup lens, and a long side in a direction perpendicular the paper plane of FIG. 2.

Figure 5A:
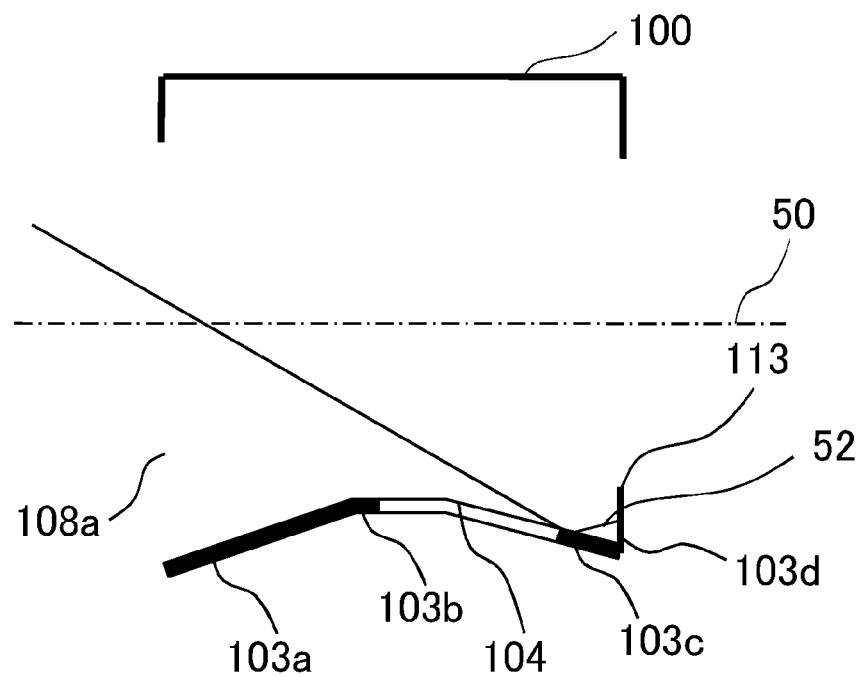
FIGS. 5A and 5B are schematic sectional views illustrating a relationship between flare and an image-pickup plane with the bottom plate.
Figure 5B:
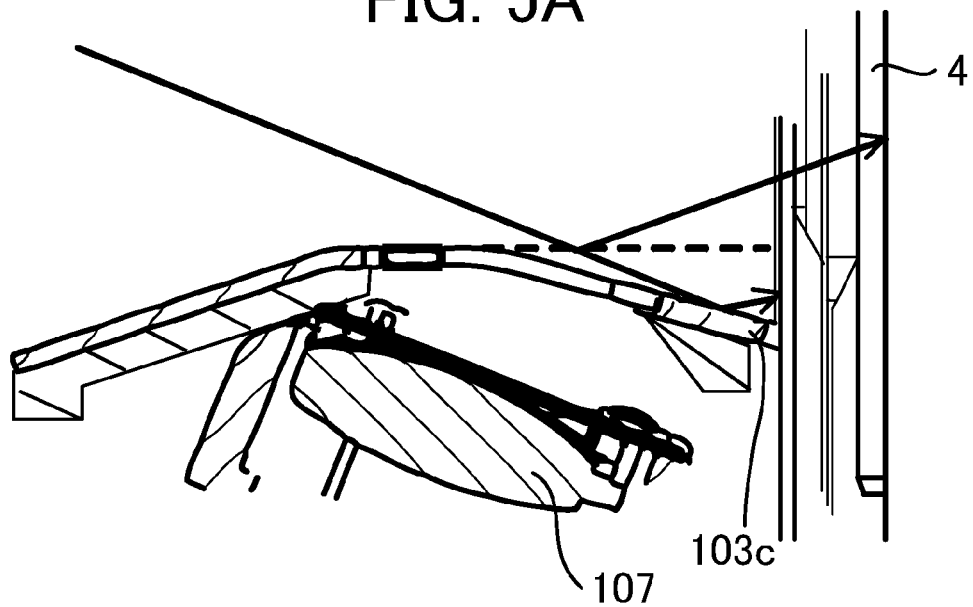

The mirror box 100 accommodates a main mirror 101 and a sub-mirror 102 which deflect part of a light flux in the mirror down state which is made by inserting these mirrors into an optical path of the light flux that has passed the image-pickup lens. The mirror box 100 has a front or first opening 108a on the image-pickup lens side (image-pickup optical system side), which the light flux that has passed the image-pickup lens enters, and a shutter opening 113 (as illustrated in FIGS. 5A and 5B which will be described later) on the image-pickup element side opposite to the image-pickup lens.

A top plate 106 is provided as a transparent flat plate at the top of the mirror box 100, and a prism box 109 is fixed above the top plate 106 and forms part of a finder optical system.

A bottom plate (bottom unit) 103 made of a light-shielding material is provided at the bottom of the mirror box 100. The bottom plate 103 is arranged between the sub-mirror 102 and the focus detecting unit 105, defines the internal space in the mirror box 100, and prevents the flare from entering the image-pickup element 4 as will be described later.

Figure 3:
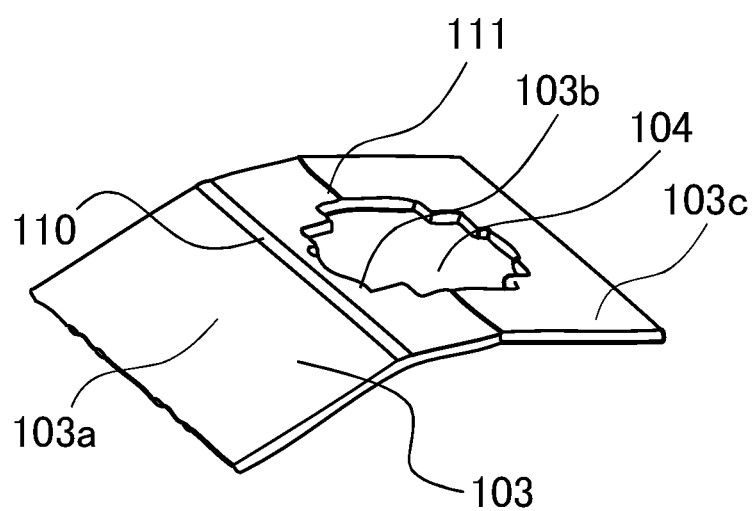
FIG. 3 is a perspective view of a mirror box's bottom illustrated in FIG. 2.

FIG. 3 is a perspective view of the bottom plate 103. A top surface of the bottom plate 103 is a bottom surface (internal surface) of the mirror box 100. The bottom plate 103 includes a front part 103a, a center part 103b, and a back part 103c.

Each of the front part 103a, the center part 103b, and the back part 103c has a plane shape or flat plate shape. The front part 103a downwardly bends (inclines) from the center part 103b, and the back part 103c downwardly bends (inclines) from the center part 103b. As a result, the bottom plate 103 has a heap shape, and is fixed onto the mirror box 100 with a convex upward (such that the center part is raised).

The front part 103a and the center part 103b are divided by a first line part 110, and the center part 103b and the back part 103c are divided by a second line part 111. Each of the first line part 110 and the second line part 111 has a predetermined width, and is parallel to each other and the long side of the image-pickup element 4. At the first line part 110 and the second line part 111, the slope angle of the bottom plate 103 is changed.

The center part 103b is arranged so that its top surface can be approximately parallel to the optical axis 50 or the top surface (or bottom surface) of the top plate 106, but this embodiment is not limited to this arrangement. The front part 103a inclines so that it becomes distant from the optical axis of the image-pickup lens as a position is distant from the first line part 110, and the back part 103c inclines so that it becomes distant from the optical axis of the image-pickup lens as a position is distant from the second line part 111.

In this embodiment, the front part 103a extends and inclines to the optical axis 50 so that it can approach to the optical axis 50 from the front opening 108a, and is not parallel to the optical axis 50 in contrast to the bottom plate as illustrated in JP 6-308375. Thus, the bottom plate 103 has a heap or convex shape upward on the sub-mirror side on the front part 103a, and this heap shape (slope) prevents the flare from reaching the image-pickup element 4 and enables the high-quality image pickup. In addition, the bottom plate 103 has a concave on the focus detecting unit side or down side in the front part 103a, which can house part of the condenser lens 107a which is part of the focus detecting unit to make small the single-lens reflex camera. In particular, the front part 103a of the bottom plate 103 slopes upwardly towards the optical axis 50 from the lower end 108b of the front opening 108, and this slope prevents the flare from reaching the image-pickup element 4. More particularly part of the condenser lens 107a, which is part of the focus detecting unit, can fit into the recess formed by the upwardly protruding part of the bottom plate to reduce the size of the single-lens reflex camera.

In addition, the back part 103c inclines from the optical axis 50 so that it becomes distant from the optical axis 50 as a position is distant from the center part 103b, and its slope angle is set so that the reflected light from the back part 103c does not enter the image-pickup element 4. A slope of the back part 103c to the optical axis 50 is not essential, but enhances the effects of maintaining the effective light flux L and of preventing the flare, and of promoting to prevent interference between the rotating sub-mirror 102 and the back part 103c.

The bottom plate 103 further includes a (second) opening 104 that is a perforation or hole that allows a light flux reflected and deflected by the sub-mirror 102 to pass the opening 104. The opening 104 crosses the center part 103b and the back part 103c, and severs the second line part 111.

The mirror box 100 houses the main (quick return) mirror 101 and the sub-mirror 102.

The main mirror 101 is made of a semitransparent material, and serves as a half-mirror in the mirror down state so that it reflects part of light to the finder optical system and transmits part of light. The sub-mirror 102 serves as a total reflection mirror in the mirror-down state so that it reflects and deflects the light transmitted by the main mirror 101 to the focus detecting unit 105. The main mirror 101 and the sub-mirror 102 move up and retreat from the optical path in the mirror-up state so as not to shield the effective light flux L to the image-pickup element 4, as illustrated in FIGS. 4A-5B. As a result, the light from the object enters the image-pickup element 4.

The focus detecting unit 105 detects a focusing state using a phase difference detection method, and includes a condenser lens 107a, a stop 107b, a secondary imaging lens 107c, an AF detector 107d, and a processor (not illustrated). The stop 107b, the secondary imaging lens 107c, and the AF detector 107d are arranged in this order from the light incident side along the optical path of the focus detecting unit 105 behind the condenser lens 107a.

The condenser lens 107a condenses a light flux reflected and deflected by the sub-mirror 102, and detects a focusing state utilizing the light. Part of the condenser lens 107a is located on the optical axis side (upper side) of a line made by extending, parallel to the optical axis 50, a lower end 108b of the front surface opening 108a, which is an end of the mirror box 100 on the bottom plate side. Thereby, the camera can be made smaller in the height direction.

The focus detecting unit 105 is arranged under the mirror box 100, and includes a straight optical system in which an optical axis of an optical system including the condenser lens 107a is such a straight line that no deflection occurs in this embodiment. More specifically, no reflector (deflector) is arranged between the condenser lens 107a and the stop 107b.

When the focus detecting unit 105 is configured as a straight optical system, no reflector is necessary, the number of components is reduced, the miniaturization and the low cost can be achieved, and the focus detection accuracy also improves. However, the straight optical system becomes long in the optical axis direction.

According to this embodiment, even when a tall straight AF optical system is installed, the focus detection accuracy can be maintained without making the camera taller. The focus detecting unit 105 is not limited to the straight optical system, and this embodiment is applicable even when a mirror is arranged between the condenser lens 107a and the stop 107b.

The phase difference focus detecting system detects a focusing state of the image-pickup lens based on a phase difference between a pair of optical images obtained from a pair of re-imaging optical systems including the condenser (field) lens 107a. The condenser lens 107a condenses the light flux from the expected imaging plane, and its optical axis is not perpendicular to the optical axis 50.

The processor (not illustrated) operates an in-focus state of an object image (optical image) of the AF detector, detects a focusing state for a plurality of focus detecting fields, and outputs an AF signal. A system controller (not illustrated) evaluates a calculating result, and issues an instruction to a focus controller (not illustrated) of the image-pickup lens, and the focus controller controls driving of the image-pickup lens.

Figure 4A:
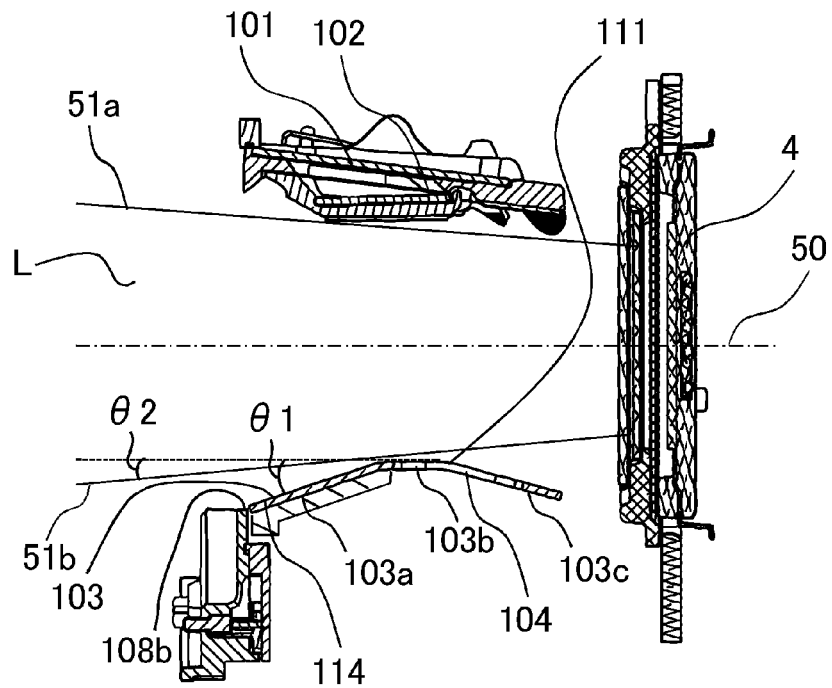
FIGS. 4A and 4B are schematic sectional views illustrating a relationship between an effective light flux and the bottom plate of the camera illustrated in FIG. 2 in the mirror-up state.

FIG. 4A is a schematic sectional view illustrating a relationship between the bottom plate 103 and the effective light flux L that has passed the image-pickup lens in the mirror-up state. Reference numeral 51a denotes a top end of the effective light flux L that is incident from the image-pickup lens upon the image-pickup element 4. Reference numeral 51b denotes a bottom end of the effective light flux L. An alternate long and short dash line denotes the optical axis 50 of the image-pickup lens.

The center part 103b is located under the lower end 51b of the effective light flux L so as not to shield the effective light flux L. In addition, the second line part 111 is arranged closer to the image-pickup element 4 than the position of the center part 103b which is closest to or crosses the bottom end 51b.

Figure 4B:
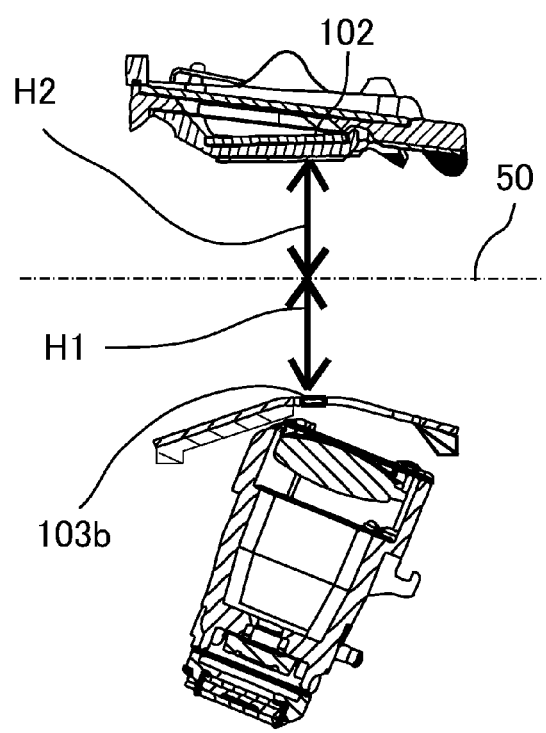

As illustrated in FIG. 4B, a minimum distance H1 between the center part 103b and the optical axis 50 is longer than a minimum distance H2 between the optical axis 50 and a bottom end of a sub-mirror holder configured to hold the sub-mirror 102 in the mirror-up state. This configuration can prevent the effective light flux L from being shielded by the bottom plate 103.

Furthermore, an angle $\theta 1$ between the front part 103a and the optical axis 50 is larger than an angle $\theta 2$ between the optical axis 50 and a ray that passes the bottom end 51b of the effective light flux L. Since the front part 103a is located outside of the effective light flux L (range), the bottom plate 103 does not shield the effective light flux L for the image-pickup lens and realizes high-quality image pickup.

FIG. 5A is a schematic sectional view illustrating a relationship between flare and an image-pickup plane with the bottom plate 103. A ray 52 that is reflected from the upper surface of the back part 103c is inclined so as not to pass the shutter opening 113 and not to reach the image pickup plane, and is shielded by a sidewall 103d that is provided at the lower side close to the image-pickup element 4 of the mirror box and defines the shutter opening 113. The sidewall 103d is arranged on or near an end of the back part 103c closest to the image-pickup element 4. While the sidewall 103d is arranged parallel to the image pickup plane of the mage pickup element 4 (and perpendicular to the optical axis 50), the present invention is not limited to this arrangement.

On the other hand, as illustrated in FIG. 5B, when the back part 103c inclines so that it can become parallel or closer to the optical axis as illustrated by the dotted line, the flare light is likely to enter the image-pickup element 4. So, in particular, if the downward inclination of the back part 103c from the center part is reduced the flare light is more likely to enter the image-pickup element.

Figure 6A:
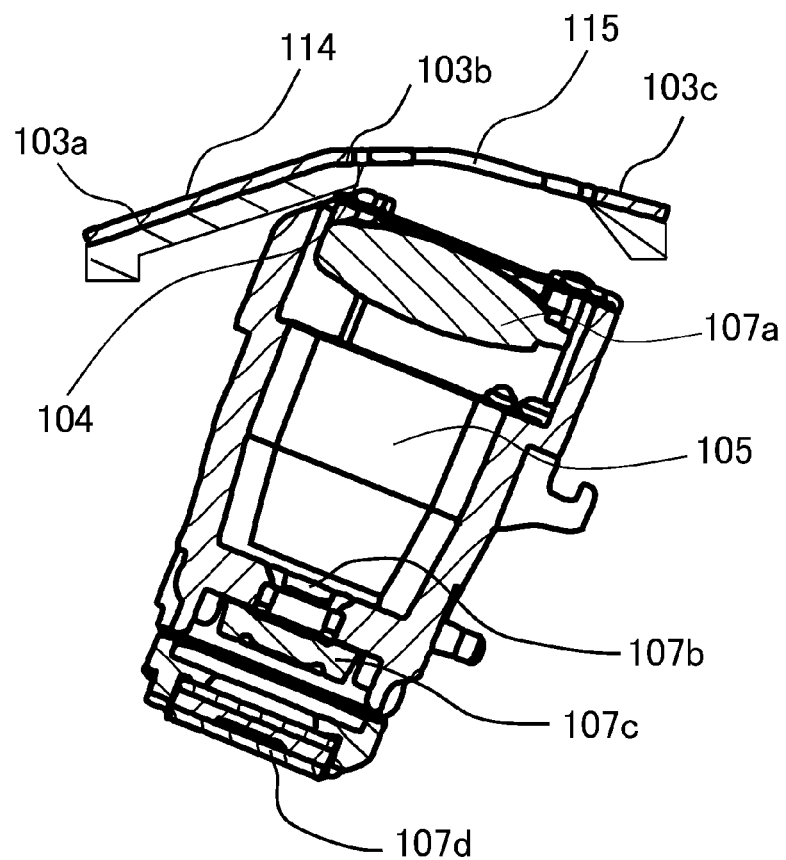
FIGS. 6A and 6B are partially enlarged sectional views of FIG. 2.
Figure 6B:
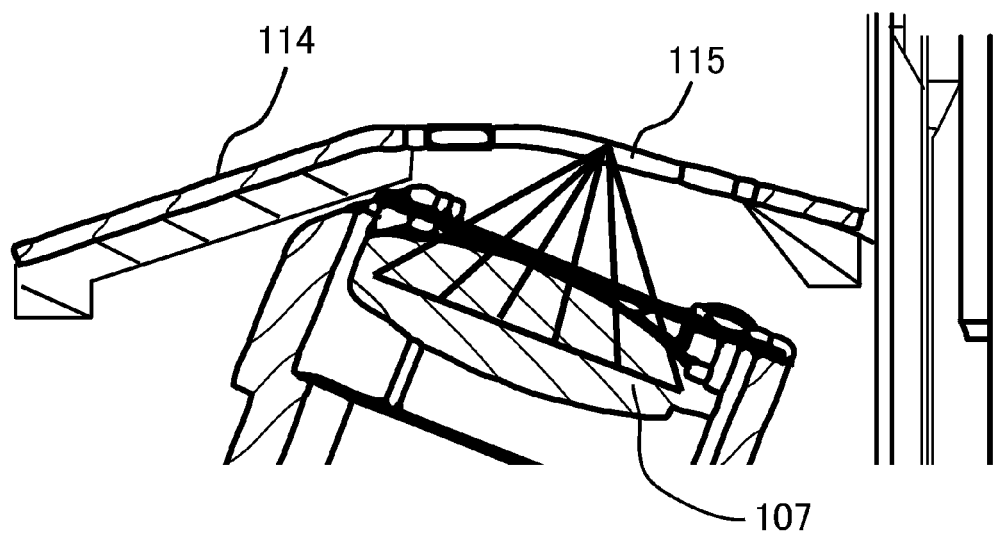
Figure 7:
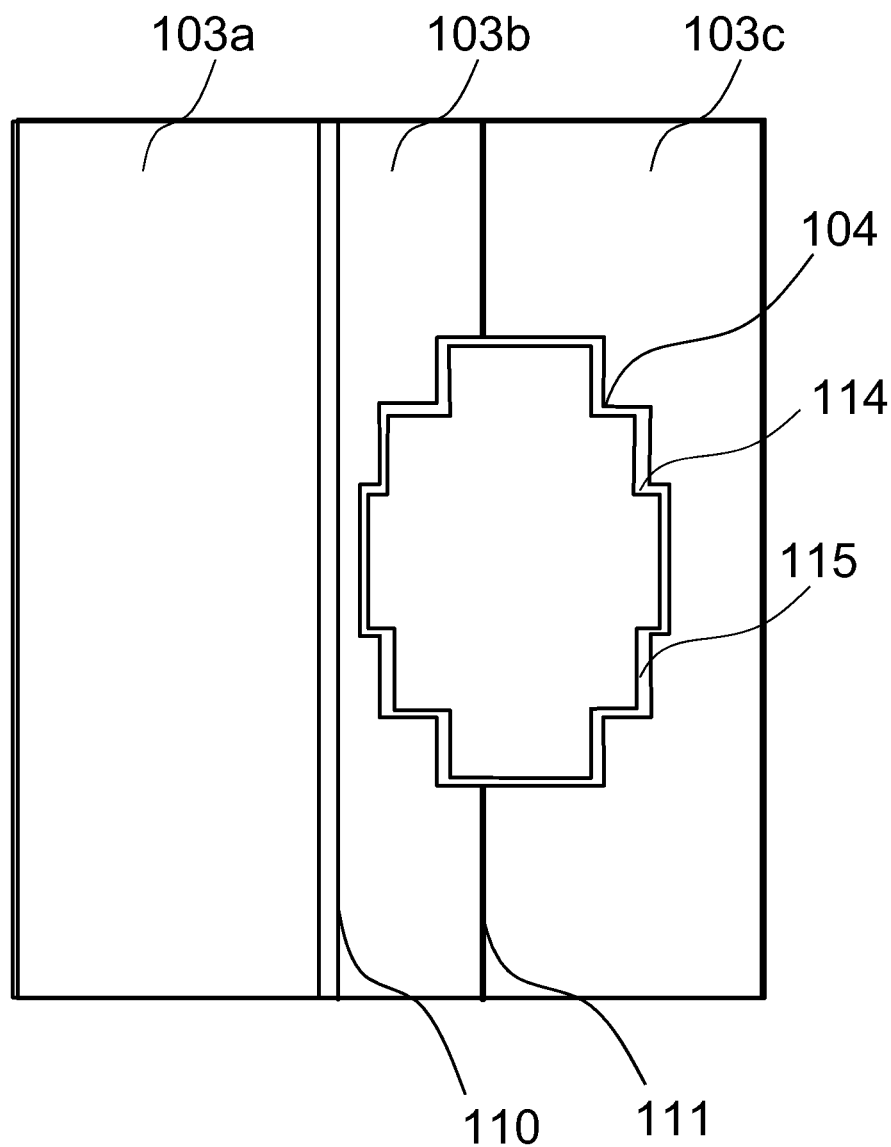
FIG. 7 is a top view of the bottom plate illustrated in FIGS. 5A and 5B.

Next follows a description of the relationship between the bottom plate 103 and the focus detecting unit 105 with reference to FIGS. 6A, 6B, and 7. FIG. 6A is a sectional view illustrating a relationship between the bottom plate 103 and the focus detecting unit 105. FIG. 6B is a partially enlarged view of FIG. 6A. FIG. 7 is a top view of the bottom plate 103.

A lightproof paper (light shielding sheet) 114 configured to sufficiently restrain reflections on the inner wall is attached (e.g. pasted or adhered using an adhesive) onto an inner surface that is a surface of the mirror box 100 on the sub-mirror side. The lightproof paper 114 pasted onto the top surface of the bottom plate 103 (which is the bottom surface of the mirror box 100) has a (third) opening 115 that is slightly smaller than and corresponds to the opening 104 of the bottom plate 103, and prevents ghost or flare.

The opening 115 forms a first field stop of the focus detecting unit 105. Since the focus detecting unit 105 does not need an(other) opening as the field stop, the focus detecting unit 105 can be made smaller by that amount.

The opening 104 or 115 of the center part 103b of the bottom plate 103 is arranged on or near the expected imaging plane of the image-pickup lens (or on or near a primary imaging plane of the condenser lens 107a as illustrated in FIG. 6B). The back part 103c is approximately perpendicular to the light flux that is reflected by the sub-mirror 102 and incident upon the focus detecting unit 105. This configuration can effectively shield the stray light that would be caused by the opening 115 and degrade the focus adjusting performance.

According to this embodiment, since the front part 103a of the bottom plate 103 inclines, the entry of the flare light reflected on the front part 103a into the image-pickup element 4 can be prevented. In addition, the front part 103a is located outside of the effective light flux L, and thus shielding of the effective light flux L from the image-pickup element 4 can be prevented. Moreover, the front part 103a secures the focus detection accuracy by preventing the stray light from entering into the focus detecting unit 105. Furthermore, the front part 103a can reduce the height of the camera by approaching the focus detecting unit 105 to the optical axis.

The back part 103c of the bottom plate 103 inclines and thus the flare reflected on the back part 103c can be prevented from directly entering the image-pickup element 4. In addition, the back part 103c is arranged outside of the effective light flux L, and thus maintains the effective light flux L entering the image-pickup element 4. The back part 103c maintains the focus detecting precision by preventing stray light from entering into the focus detecting unit 105. Moreover, the back part 103c can reduce the height of the camera by approaching the focus detecting unit 105 to the optical axis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-258706, filed on Nov. 19, 2010, which is hereby incorporated by reference herein in its entirety.

What is claimed is:

1. A single-reflex camera comprising:
  a mirror box configured to house a mirror configured to deflect part of a light flux that has passed through an image-pickup optical system when the mirror is inserted into an optical path of the light flux; and
  a focus detecting unit that includes a condenser lens configured to condense a light flux deflected by the mirror, and provides focus detections using light condensed by the condenser lens and a phase difference method,
  wherein the mirror box further includes:
    a first opening, arranged to allow the light flux that has passed through the image-pickup optical system to enter the mirror box;
    a bottom plate arranged between the mirror and the focus detecting unit, the bottom plate including a front part that inclines towards an optical axis of the image-pickup optical system as it extends away from the first opening, and
  wherein part of the condenser lens is located on a side of the optical axis of the image-pickup optical system with respect to a line extending from a bottom end of the first opening parallel to the optical axis of the image-pickup optical system wherein the bottom end of the first opening is the end of the first opening closest to the bottom plate,
  wherein the bottom plate further includes:
    a plate-shaped center part positioned further away from the image-pickup optical system than the front part, wherein the center part is the closest part of the bottom plate to the optical axis; and
    a plate-shaped back part that inclines away from the optical axis as it extends away from the center part.

2. The single-reflex camera according to claim 1, wherein the bottom plate is arranged on or near an expected imaging plane of the image-pickup optical system, and includes a second opening into which the light flux deflected by the mirror passes.

3. The single-reflex camera according to claim 1, further comprising a light shielding sheet attached to one surface of the bottom plate on a mirror side.

4. The single-reflex camera according to claim 1, wherein the bottom plate further includes a second opening into which the light flux deflected by the mirror passes, and
   wherein the single-reflex camera further includes a light shielding sheet attached to one surface of the bottom plate on a mirror side, the light shielding sheet having a third opening that is located on the second opening, is arranged on or near an expected imaging surface of the image-pickup optical system, and arranged to serve as a field stop of the focus detecting unit.

5. The single-reflex camera according to claim 4, wherein the third opening is smaller than the second opening.

6. The single-reflex camera according to claim 1, wherein a minimum distance between the bottom plate and the optical axis is larger than a minimum distance between a mirror holder configured to hold the mirror and the optical axis.

7. The single-reflex camera according to claim 1, wherein an angle between the front part of the bottom plate and the optical axis is larger than an angle between the optical axis and a bottom end of an effective light flux that has passed the image-pickup optical system.

8. The single-reflex camera according to claim 1, wherein the mirror box further includes a sidewall configured to shield a light flux reflected from the back part and provided on the back part at a side opposite to the image-pickup optical system.

* * * * *